Patented Nov. 24, 1953

2,660,602

UNITED STATES PATENT OFFICE 2,660,602

PROCESS FOR PREPARING BRANCHED PRIMARY SULFATE ESTERS

Herbert K. Wiese, Cranford, N. J., assignor to Standard Oil Development Company, a corporation of Delaware No Drawing. Application April 27, 1950, Serial No. 158,589

7 Claims. (Cl. 260—460)

This invention is concerned with the preparation of branched primary sulfate esters by combining ethylene with another olefin in the presence of concentrated sulfuric acid. More particularly, the invention involves the reaction of ethylene with another mono-olefin, particularly a tertiary olefin, in the presence of concentrated sulfuric acid to produce a branched primary sulfate ester.

It is well known that a primary sulfate ester cannot be produced from an olefin and sulfuric acid, with the exception of ethyl sulfate from ethylene. In all cases only a secondary sulfate ester will result. Tertiary sulfate esters are believed to be formed but cannot be isolated. This invention involves a process for producing branched primary sulfate esters having 5 carbon atoms or more by combining ethylene with another olefin (co-reactant) in the presence of 80–100 weight per cent sulfuric acid, preferably 90–98 weight per cent sulfuric acid.

The reaction scheme may be generalized as follows:

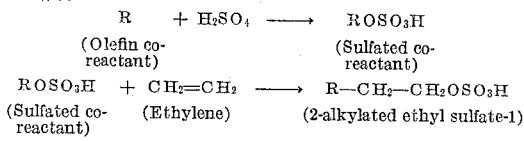

Therefore this process claims the production of alkylated ethyl sulfates in which the co-reactant is always attached to the carbon atom adjacent to the carbon atom containing the sulfate group. More specifically, when using, for example, isobutylene as the co-reactant the overall reaction can be written as follows:

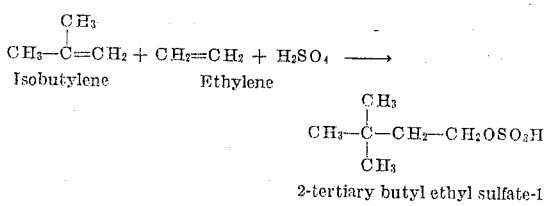

2-tertiary butyl ethyl sulfate-1

The co-reactant is a tertiary, secondary or primary olefin or mixtures thereof selected from the aliphatic and/or alicyclic series. Its molecular weight can range from 42 to 420 ($C_3$ to $C_{30}$) and higher. It is also possible to use a diolefin as co-reactant and obtain a dihydroxy compound containing either two primary hydroxyl groups or one primary and one secondary depending on reaction conditions.

The reaction itself is carried out by simultaneously contacting sulfuric acid of 80–100 weight per cent strength, preferably 90–98 weight per cent, with ethylene and the olefin co-reactant at temperatures ranging from −25° C. to +80° C., preferably −15° C. to +45° C. The optimum results are obtained by maintaining an ethylene partial pressure of 50–1000 p. s. i. g., preferably 100–250 p. s. i. g, over the sulfuric acid and continuously feeding the co-reactant to the reactor. In some cases it is of particular advantage to use temperatures below the critical temperature of ethylene (9.6° C.) and sufficient pressure to maintain ethylene in the liquid form.

The rate of self-polymerization of the co-reactant, particularly the lower molecular weight co-reactants, and more particularly the tertiary olefins, is known to be faster than the rate of combination of the co-reactant with ethylene. Therefore, in order that the combination of the co-reactant with ethylene predominates, it is important to maintain a high ethylene/co-reactant ratio in the reaction zone. This is accomplished by using (1) ethylene under pressure and (2) by regulating the addition of the co-reactant to the ethylene and sulfuric acid in the reaction zone, in such a manner, that the rate of addition is essentially equal to the rate of combination of ethylene with the co-reactant. For example, with such co-reactants as isobutylene or 2-methylpentenes the rate of addition of the co-reactants is so maintained that the molar ratio of ethylene/isobutylene or 2-methylpentenes in the reaction zone is greater than 50:1. This ethylene-co-reactant ratio in the reaction zone can vary widely depending on the co-reactant and reaction conditions such as temperature, pressure, acid concentration, etc. With such co-reactants, as for example, $C_{24}$-polypropylene, tetra-isobutylene or any other olefin where the rate of self-polymerization is negligible, ethylene/co-reactant ratios less than 50:1 can be employed.

The desired branched primary sulfate ester is produced by adding the pure olefin to the reactor containing the sulfuric acid of the appropriate strength, and ethylene under the desired pressure. To assure high yields of primary sulfate ester it is preferred to have an inert hydrocarbon diluent present in the reaction zone particularly when employing the lower molecular weight olefins or co-reactants. However, this diluent may be dispensed with when employing the higher molecular weight olefins such as $C_{12}$–$C_{24}$ olefin polymers, etc. In the latter case the higher molecular weight olefins themselves act as the diluent since their rates of self-polymerization are negligibly low. The inert diluent is any non-reactive organic material, such as saturated aliphatic and/or alicyclic hydrocarbons and any derivative thereof, provided they are substantially chemically inert toward sulfuric acid under the conditions employed. Such saturated hydrocarbons are preferably n-paraffins but iso-paraffins are also useful. However, when employing an inert diluent consisting predominantly of a branched chain paraffin, it is desirable that the paraffin have the same carbon skeleton structure as the olefinic co-reactant. Otherwise, a decrease in the selectivity to the desired alcohol may result. The volume ratio of inert diluent to sulfuric acid that is most advantageous in either a batch or continuous type operation ranges from 10:1 to 1:10, preferably 3:1 to 1:1.

It is, of course, understood that when employing an inert diluent good intermixing between the acid phase and the diluent phase is particularly essential. The diluent may be, if desired, introduced to the reactor prior to feeding the co-reactant. It is also possible to use a co-reactant feed consisting of a mixture of a co-reactant and an inert diluent. Such a feed may, for example, comprise a selected fraction derived from a cracked petroleum stock containing the desired co-reactant and a saturated hydrocarbon or hydrocarbons. When using a diluted co-reactant feed it is advantageous to continuously withdraw part of the inert diluent in order that the desired diluent/sulfuric acid ratio is maintained in the reaction zone. This is accomplished in one manner, for example, in a continuous type operation, by introducing the co-reactant feed at the bottom of a reactor containing the sulfuric acid intermixed with the inert diluent, and continuously withdrawing some of the co-reactant-free diluent from the top of the reactor. The desired ethylene partial pressure is, of course, maintained in the reaction zone.

The acid layer is withdrawn from the reaction zone after an extract strength of 0.2 to 1.0, preferably about 0.5, has been obtained. The extract strength is defined as moles of produced olefins, that is, the olefin derived from a combination of ethylene with the co-reactant, per mole of sulfuric acid. Although the primary sulfates produced according to this invention find most application in the use of their derivatives, the sulfates themselves are useful products and may be isolated as such. The lower molecular weight branched primary alkyl sulfates are recovered in the following manner. The mixture of sulfate and sulfuric acid is neutralized with caustic or carbonate wherein the sulfate is converted to the sodium salt. The salt is extracted with alcohol, the solvent removed and the salt re-acidified to produce the sulfate. The 3,3-dimethylbutyl sulfate-1 isolated in such a manner is an oily liquid which has a density at 20° C. of about 1.14 and a refractive index at 20° C. of about 1.42. The neutralization equivalent was 188 (theoretical 182.2). The higher molecular weight sulfates ($\geq C_{12}$) may be extracted from the sulfuric acid directly by means of a solvent such as an aliphatic hydrocarbon, for example, hexane which may be removed by distillation, leaving the purified alkyl sulfate.

The primary sulfates produced according to this invention can be converted to many useful products. For example, upon hydrolysis with water using well established procedures, branched primary alcohols are obtained. To illustrate this, the results of two runs are tabulated below. These batch runs were made with 95.5 weight percent sulfuric acid at −15° C. and with n-heptane as the inert diluent (volume ratio of heptane/sulfuric acid 6:1). An ethylene partial pressure of about 115 p. s. i. g. was maintained in the reactor. In both runs the pure co-reactant was fed to the reactor over a 3-hour period. An extract strength of about 0.5 was thus obtained. The primary sulfate ester was then hydrolyzed with water and the corresponding alcohols isolated by known methods.

| Olefin co-reactant | Alcohol obtained | Mol percent yield (based on co-reactant) |
|---|---|---|
| Isobutylene | 3,3-dimethylbutanol-1 | Approx. 60.0. |
| Mixed 2-methylpentenes (80% 2-methylpentene-2, 20% 2-methylpentene-1). | 3,3-dimethylhexanol-1. | Approx. 35.0. |

Similarly runs were made with a feed consisting of a mixture of hexenes having a boiling range of 61–71° C., in which the ratio of tertiary/secondary olefins was approximately 3.5:1. The alcohol obtained from this feed in a substantial yield consisted of hexyl ethanols. Furthermore, a run was made using 1-methylcyclopentene as feed in which case an 2-alkylated ethanol was obtained in which the branching consisted of an alicyclic radical. Operating data and product analysis for typical runs are set forth in the following table.

Table.—Alkylation of ethylene in the presence of sulfuric acid to produce alkylated ethanols

| Run No. | 714-5 | 714-11 | 714-19 | 714-27 | 714-35 | 714-47 | 714-43 | 714-65 |
|---|---|---|---|---|---|---|---|---|
| Temperature of run, °C | −15 | −17 | −15 | −15 | −15 | −15 | −15 | −17. |
| Charge: | | | | | | | | |
| Ethylene pressure, p. s. i. gage. | 80 | 80 | 80 | 100 | 115 | 115 | 115 | 115. |
| Mols of $H_2SO_4$ [1] | 4.0 | 1.77 | 1.33 | 1.32 | 1.34 | 1.3 | 1.3 | 0.9. |
| Olefin used, co-reactant | 1-methyl-cyclo-pentene. | Iso-butyl-ene.[a] | Iso-butyl-ene.[a] | Iso-butyl-ene.[a] | Iso-butyl-ene.[a] | Iso-butyl-ene.[a] | 2-methyl-pent-enes.[c] | Hexenes.[d] |
| Mols of co-reactant | 0.44 | 0.45 | 0.95 | 0.49 | 0.49 | 0.50 | 0.42 | 1.4. |
| Time used to add co-reactant to reactor, hrs. | 2.0 | 3.8 | 5.5 | 2.8 | 3.3 | 2.8 | 3.0 | 4.5. |
| Diluent | n-Pentane | n-Hexane | n-Hep-tane. | n-Hep-tane. | n-Hep-tane. | 2-methyl-pentane. | n-Hep-tane. | |
| Volume ratio diluent/$H_2SO_4$. | 1.9 | 5 | 6.5 | 6.5 | 6.5 | 6.5 | 6.5 | 2.0. |
| Recovered: | | | | | | | | |
| Ethanol, mols | 0.19 | 0.17 | 0.06 | 0.12 | 0.17 | | 0.10 | 0.13. |
| Alkylated ethanols, type [2] | Alcohol [5] | Isohexyl [6] | Isohexyl [6] | Isohexyl [6] | Isohexyl [6] | Isohexyl [6] | Iso-octyl | Iso-octyl. |
| Alkylated ethanols, mols. | 0.095 | 0.18 | 0.38 | 0.24 | 0.29 | 0.24 | 0.14 | 0.33. |
| Higher alcohol, primary [e] | | | | | | 0.03 [b] | | 0.25.[b] |
| Ethylene, liters at RTP | | 24.5 | 24.5 | 2 | 36.7 | 34.0 | 30.0 | 18.0. |
| Mol. percent yield of alcohol, approx.[4] | 21.5 | 40.0 | 40.5 | 49.0 | 58.0 | 48.0 | 33.3 | 23.6. |

[1]. Conc. sulfuric acid 95-96%.
[2] Alcohol determined by fractionating crude alcohol obtained from hydrolysis of acid phase and determining hydroxyl content by acetylation of cuts.
[4] Based on co-reactant charged.
[5] Infra-red shows product to be a primary alcohol containing a cyclohexyl or cyclopentyl type ring.
[6] 3,3-dimethyl butanol-1, B.P. 142.5° C. $n_D^{20}$ 1.4142. Literature value 142.5° C. $n_D^{20}$ 1.4143.
[a] 98.0% pure.
[b] Infra-red indicates primary hydroxyl.
[c] 80.0% 2-methylpentene-2, 20.0% 2-methylpentene-1.
[d] Hexene cut, B. P. 61–71° C., 83.8% unsaturates, ratio of tertiary/secondary 3.5/1.
[e] Alcohols derived from polymerized co-reactant and ethylene.

The acetate derived from 3,3-dimethylbutanol and glacial acetic acid by the usual esterification process is useful as a lacquer solvent. The di-octyl phthalate ester derived from phthalic anhydride and the branched chain ethanol can be employed as a plasticizer for polyvinyl chloride type plastics and others.

In addition to hydrolyzing the primary sulfates to the corresponding primary alcohols, the sulfate esters containing from about 12 to 20 carbon atoms can be neutralized with an alkaline base or carbonate to produce a water-soluble detergent. For example, the sodium salt of the sulfate ester derived from $C_{12}$-polypropylene and ethylene was found to possess definite detersive properties (sodium salt of $C_{14}$-alkyl sulfate).

Furthermore, the primary sulfate esters may be reacted with hydrogen halides such as HI, HBr, HCl, or HF to produce the corresponding primary organic halide, according to the equation:

$$RSO_4 + 2HCl \rightarrow 2RCl + H_2SO_4$$

where R represents a branched primary alkyl radical.

The production of the primary sulfate ester is carried out according to conditions previously recited. The hydrohalogenation step is carried out as follows:

The acid extract layer comprising the primary sulfate ester is treated with an anhydrous hydrogen halide at temperatures ranging from 0° C. to 100° C., preferably about 25° C. to 50° C. The primary halides will form by passing the anhydrous hydrogen halide into the acid extract layer. However, it is advantageous, in some cases, to maintain a hydrogen halide pressure ranging from 1 to 4 atmospheres, preferably about 1 to 2 atmospheres, over the acid layer. The organic halides are insoluble in sulfuric acid and therefore will settle out as a separate layer, thus making their separation a simple mechanical operation. It is also possible to have an inert solvent present during the hydrohalogenation to dissolve the organic halide as produced. This solvent for example may be the same as the saturated hydrocarbon present in the reactor during the production of the primary sulfate ester. When using the saturated hydrocarbon from the reactor it is necessary to free it of ethylene prior to the hydrohalogenation step.

The primary sulfate ester will undergo other reactions with suitable reagents, such as, ammonia to form primary amines, alcoholysis to form other esters and mixed neutral sulfates, and the like. Heating results in the acid sulfate esters decomposing to alpha olefins which are valuable in many chemical syntheses.

What is claimed is:

1. A process for producing a branched primary alkyl sulfate which comprises reacting ethylene with a tertiary $C_3$–$C_{30}$ olefin in the presence of 90–98 weight per cent sulfuric acid at a temperature of −25° C. to +80° C., and at an ethylene partial pressure of 50–1000 p. s. i. g. whereby a branched primary alkyl sulfate is obtained having two more carbon atoms than the tertiary olefin reactant.

2. A process for producing 3,3-dimethylbutyl sulfate-1 which comprises reacting ethylene with isobutylene in the presence of 90–98 weight per cent $H_2SO_4$ at a temperature of −25° C. to +80° C., and at an ethylene partial pressure of 100–250 p. s. i. g.

3. A process for producing 3,3-dimethylhexyl sulfate-1 which comprises reacting ethylene with a 2-methylpentene in the presence of 90–98 weight per cent $H_2SO_4$ at a temperature of −25° C. to +80° C., and at an ethylene partial pressure of 100–250 p. s. i. g.

4. A process according to claim 1 in which the reaction is carried out in the presence of an aliphatic hydrocarbon diluent.

5. A process according to claim 1 in which the ratio of ethylene to the olefin in the reaction mixture is greater than 50:1.

6. A process according to claim 2 in which the reaction is carried out in the presence of a normal paraffin as a diluent.

7. A process according to claim 2 in which the reaction is carried out in the presence of hexanes.

HERBERT K. WIESE.

References Cited in the file of this patent

UNITED STATES PATENTS

| Number | Name | Date |
|---|---|---|
| 2,210,316 | Driesbach | Aug. 6, 1940 |